United States Patent [19]

Sigle

[11] Patent Number: 4,846,084
[45] Date of Patent: Jul. 11, 1989

[54] LEVELING LINKAGE FOR PLANTER UNITS

[76] Inventor: Arris A. Sigle, H.C. 1, Box 2, Luray, Kans. 67649-9743

[21] Appl. No.: 158,691

[22] Filed: Feb. 22, 1988

[51] Int. Cl.$^4$ .............................................. A01C 7/08
[52] U.S. Cl. .................................... 111/136; 111/926; 111/927; 172/310; 172/624.5
[58] Field of Search ...................... 172/624.5, 310, 497, 172/498, 307, 424, 506; 111/85, 52, 63, 59

[56] References Cited

U.S. PATENT DOCUMENTS

| | | | |
|---|---|---|---|
| 666,961 | 1/1901 | Funk | 172/506 X |
| 2,349,343 | 5/1944 | Graham | 172/307 X |
| 2,492,573 | 12/1949 | Hearron | 172/474 |
| 2,612,825 | 10/1952 | Walker | 172/195 |
| 2,754,738 | 7/1956 | Brown | 172/7 |
| 3,090,333 | 5/1963 | Caha | 111/63 |
| 3,101,790 | 8/1963 | Rice | 172/494 |
| 3,465,832 | 9/1969 | De Larm | 172/491 |
| 3,560,023 | 2/1971 | Norton et al. | 280/475 |
| 3,613,801 | 10/1971 | Roth | 172/456 |
| 3,797,418 | 3/1974 | Bridger, Jr. | 111/73 |
| 3,886,875 | 6/1975 | Ernst | 111/85 |
| 4,030,428 | 6/1977 | Truax | 111/85 |
| 4,077,478 | 3/1978 | Neukom | 172/267 |
| 4,232,747 | 11/1980 | Phenninger et al. | 172/311 |
| 4,373,591 | 2/1983 | Schaaf et al. | 172/328 |
| 4,422,392 | 12/1983 | Dreyer | 111/85 X |
| 4,440,235 | 4/1984 | Colistro | 171/65 |
| 4,519,325 | 5/1985 | Miller | 111/85 |
| 4,623,024 | 11/1986 | Schlenker | 172/624.5 X |
| 4,726,304 | 10/1985 | Dreyer | 111/85 X |
| 4,750,441 | 6/1988 | Pfenninger | 111/85 |

FOREIGN PATENT DOCUMENTS 1247031 9/1971 United Kingdom .................. 111/85

Primary Examiner—Richard J. Johnson
Assistant Examiner—Jeffrey L. Thompson
Attorney, Agent, or Firm—Litman, McMahon & Brown

[57] ABSTRACT

A leveling linkage is provided on a planter unit of a planter implement. Each planter unit includes a leveling spring for supporting a back end of the plant unit in its raised, transport position. The leveling linkage is connected to a mounting bracket and a draft frame of the planter unit, which move relative to each other when the implement is raised and lowered. The leveling linkage extends the leveling spring when the implement is in its transport position and retracts the leveling spring when the implement is in its work position.

19 Claims, 1 Drawing Sheet

LEVELING LINKAGE FOR PLANTER UNITS

BACKGROUND OF THE INVENTION

1. Field of the Invention

The present invention relates generally to mechanical linkages, and in particular to a linkage for leveling a vegetable planter.

2. Description of the Prior Art

Mechanical linkages between tools, equipment and the like are well known and a variety of different designs have heretofore been devised to fulfill the requirements of particular applications. For example, many agricultural implements are designed for pulling by tractors and are connected thereto by mechanical linkages. A common type of tractor-mounted linkage is referred to in the industry as a three-point hitch and includes a laterally spaced pair of draft links and a center link positioned therebetween. The draft links are generally coupled to lifting arms which are raised and lowered by a rockshaft actuated by a hydraulic cylinder. The center link is generally adjustable so that the fore and aft pitch of the implement can be adjusted by the operator.

In operation, most tractor-drawn agricultural implements are repeatedly raised and lowered between transport positions above a ground surface and engaged work positions. Raising is accomplished with the aforementioned three-point hitch lifting arms. Implements are raised to their transport positions at the end of each pass through a field when the equipment must be turned around and when the equipment is transported from a storage area to a work area.

However, some implements are hinged for "floating" operation over uneven terrain and are susceptible to damage in their raised, transport positions. For example, the Model No. 33 vegetable planter manufactured by Deere & Company of Moline, Ill. includes a carriage assembly mounting a drive wheel at the front and a press wheel at the back. Such vegetable planters are generally mounted in even-numbered multiples on a transversely extending toolbar, which in turn is connected to a tractor three-point hitch.

The planter carriage is pivotally mounted and is adapted to rock fore and aft about a transverse pivotal axis between the drive and press wheels. Since each planter unit is thus adapted to float over uneven terrain, its drive and press wheels are maintained in continuous contact with a ground surface. However, when the planter is raised to its transport position the carriage generally rotates to a sloping orientation with its front drive wheel elevated and its rear press wheel lowered almost to the ground. In such a transport configuration the rear press wheel can engage the ground, and may in fact slide sideways along the ground if the tractor is turning with the rear press wheel engaged. Such lateral sliding is a frequent cause of planter damage. Hence, it is important to elevate the entire planter in its transport position enough so that its wheels do not contact the ground.

Another problem with such freely-tiltable planter units is that they include runner openers for depositing the seeds in the ground which tend to clog with dirt if the planter unit is tilted rearwardly when lowered. Furthermore, when the sloping carriage is lowered from its transport position to its work position, the rear press wheel can bounce upon impact and initiate harmful fore-and-aft rocking as the front and back wheels alternately bounce while the planter is lowered to the ground.

To overcome these problems, Deere & Company provides leveling spring attachments for preventing its Model No. 33 planters from tilting to the rear. However, a problem associated with the Deere & Company leveling spring attachment is that it remains in tension when the planter unit is in a work position which tends to lift or unload the rear press wheel. Insufficient down pressure on the rear press wheel can lead to poor soil compression over the newly planted seeds with lower crop yields as the ultimate result. The Deere & Company leveling spring attachment also tends to rapidly wear out the metal planter parts to which it is attached. The present invention addresses these problems with previous vegetable planters.

SUMMARY OF THE INVENTION

In the practice of the present invention, a leveling linkage is provided in combination with a planter unit mounted on a toolbar for pulling behind a tractor as part of a planter implement. The implement is movable by a three-point hitch on the tractor between a raised, transport position and a lowered, work position. The planter unit is mounted on the toolbar by a mounting bracket assembly. A draft frame is connected to the mounting bracket assembly and, together with a leveling spring, provides the primary support for the planter unit in its transport position. The leveling linkage is attached to the leveling spring and includes a crank pivotably mounted on the draft frame. The leveling linkage also includes a crank rod interconnecting the mounting bracket assembly and the crank. The leveling linkage extends the leveling spring when the implement is in its transport position and retracts the leveling spring when the implement is in its work position. With the implement in its work position, the retracted spring does not tend to unload a rear, press wheel of the planter which would tend to interfere with the planter unit's operation. With the implement in its transport position, the leveling spring supports the back end of the planter unit and prevents it from dropping into close proximity with the ground.

OBJECTS OF THE INVENTION

The principal objects of the present invention are: to provide a leveling linkage for a planter; to provide such a leveling linkage which is readily adaptable to existing planters; to provide such a leveling linkage which supports a planter rear press wheel in spaced relation well above the ground surface with the planter in a raised, transport position; to provide such a leveling linkage which extends a leveling spring for supporting a planter back end with the planter implement in a transport position; to provide such a leveling linkage which retracts a leveling spring with the planter in a work position; to provide such a leveling linkage which provides for the fully weighted operation of a rear press wheel; to provide such a leveling linkage which facilitates proper operation of a planter; to provide such a leveling linkage which tends to improve crop yields by improving planter performance; and to provide such a leveling linkage which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

I. INTRODUCTION

Figure 1:
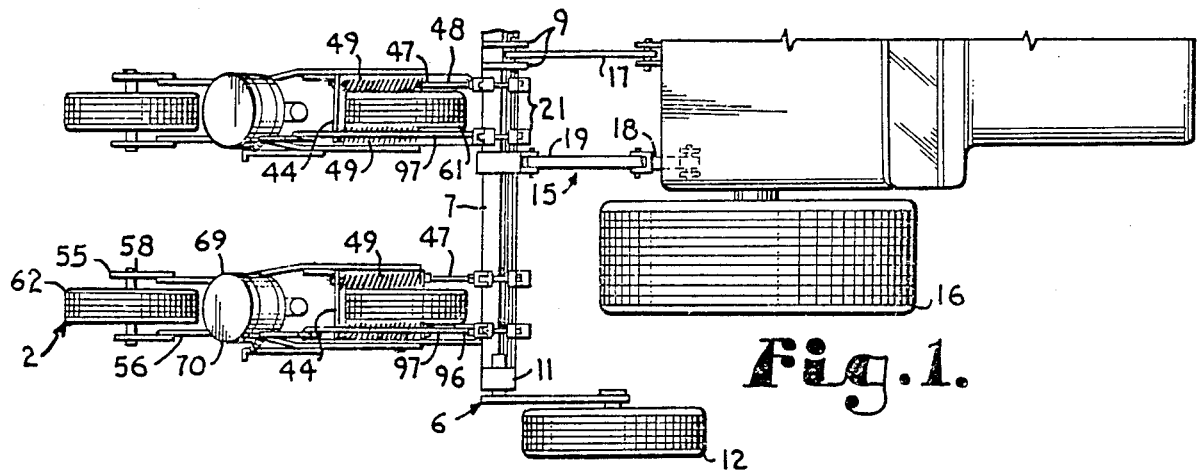
FIG. 1 is a fragmentary, top plan view of a tractor and planter implement with leveling linkages embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. VEGETABLE PLANTER IMPLEMENT

Referring to the drawings in more detail, the reference numeral 1 generally designates a leveling linkage embodying the present invention. Without limitation on the useful applications of the linkage 1, it is shown mounted on a vegetable planter 2 comprising, for example, a Model No. 33 available from Deere & Company of Moline, Ill. Even-numbered multiples of the planter units 2 are generally employed to form a planter implement such as that partially shown at 6.

The implement 6 includes a transversely-extending, solid toolbar 7 with a square cross-sectional configuration. A pair of masts 9 project upwardly from the center of the toolbar 7. A pair of gauge wheel assemblies 12 project forwardly from opposite ends 11 of the toolbar 7.

The planter implement 6 is adapted for mounting on a three-point hitch assembly 15 of a tractor 16. The three-point hitch assembly 15 includes a center link 17 and a pair of side, draft links 19. The draft links 19 are raised and lowered by respective lifting arms 18. The center link 17 is pivotally coupled to the upper ends of the toolbar masts 9 and the draft links 19 are pivotally coupled to the toolbar 7 on either side of the toolbar masts 9.

Each vegetable planter unit 2 is mounted on the toolbar 7 by a pair of mounting bracket assemblies 21 each including front and back bracket members 22, 23 with opposed V-shaped notches 24, 25 adapted to receive respective front and back edges of the toolbar 7. The back bracket member 23 comprises a channel section with upper and lower ends 28, 29. The front and back bracket members 22, 23 are tightly clamped on the toolbar 7 by bolts 32 and nuts 33.

A pair of planter draft frames 37 each includes a horizontal draft frame bar 38 with a front end 42 pivotally attached at point P1 to a respective back bracket member lower end 29. Each planter draft frame 37 also includes a vertical draft frame bar 39 with upper and lower ends 40, 41. A back end 43 of the horizontal draft frame bar 38 is fixedly attached to the vertical draft frame bar 39 between its ends 40, 41. The upper ends 40 of each associated pair of vertical draft frame bars 39 are connected by a transverse pressure rod plate 44 with a transversely spaced pair of receivers 45. A pair of pressure rod assemblies 47 with pressure rods 48 and helical pressure springs 49 extend from the back bracket members 23 through respective receivers 45 and mount stop adjustment nuts 51 and lock nuts 50. Each pressure spring 49 is compressed between a respective adjustable spring clip 52 mounted on a respective pressure rod 48 and the pressure rod plate 44.

A carriage assembly 55 includes a pair of carriage frame members 56 each having front and back ends 57, 58. A drive wheel 61 is mounted between the carriage frame member front ends 57 and a press wheel 62 for pressing earth over the planted seeds is mounted between the back ends 58. Between their respective ends 57, 58, the carriage frame members 56 are pivotally connected to respective vertical draft frame bar lower ends 41 at points P5. A semi-circular leveling stop plate 65 is mounted on one of the vertical draft frame bars 39 above its lower end 41 and includes a detent 66 for adjusting the stop position of the carriage assembly 55 as it rocks or teeters on the draft frames 37.

A seed dispensing system 69 is provided between the wheels 61, 62 and includes a seed hopper 70 mounted on top of the carriage assembly 55 and a runner opener 71 projecting downwardly therefrom. A pair of covering knives 72 project downwardly and rearwardly from the carriage assembly 55 behind the runner opener 71. The seed dispensing system 69 is driven by chain-and-sprockets (not shown) connected to the drive wheel 61.

Figure 2:
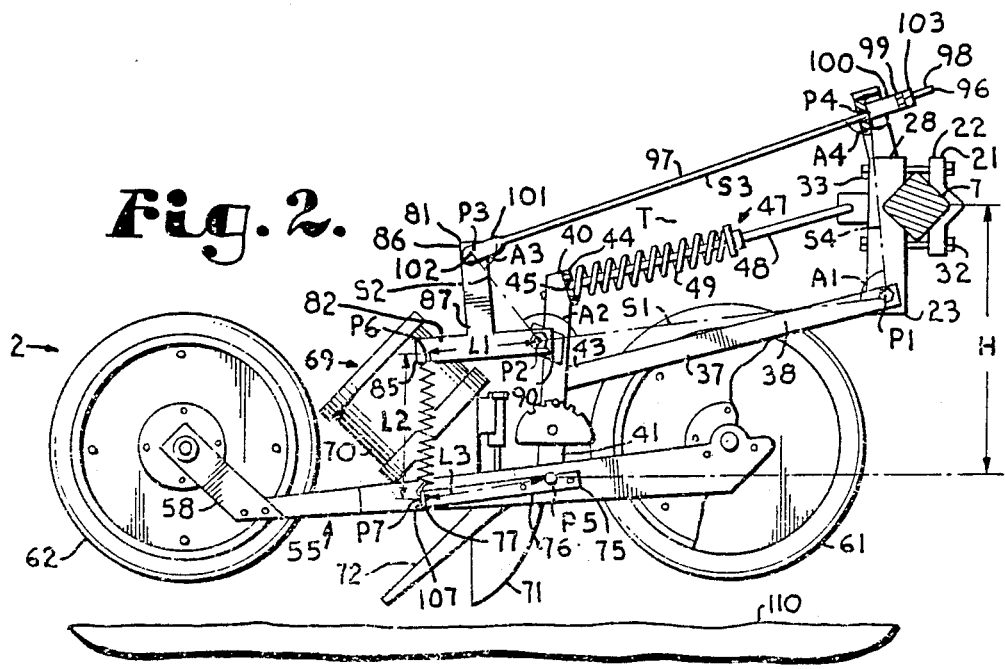
FIG. 2 is a side elevational view of the implement in a transport position.
Figure 3:
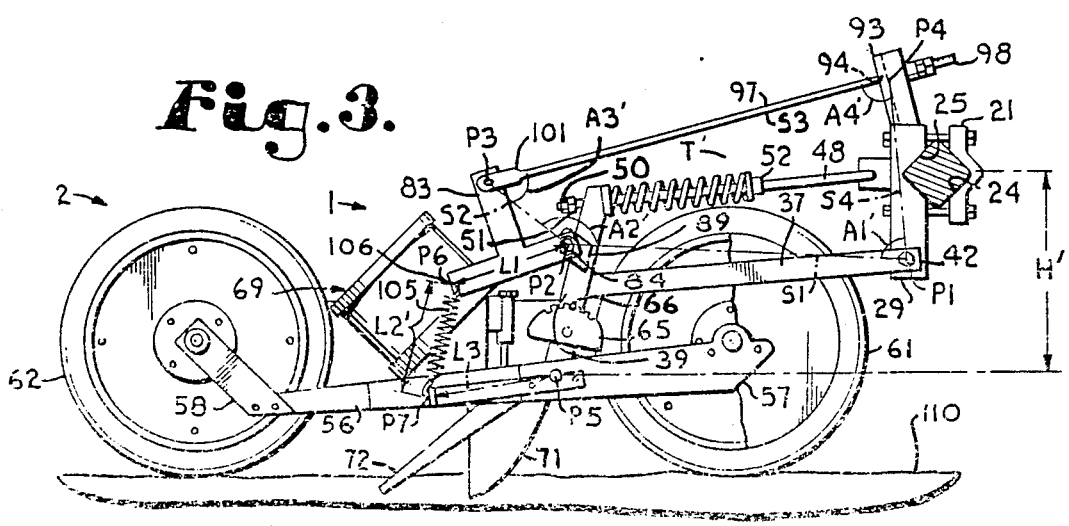
FIG. 3 is a side elevational view of the implement in a work position.

An L-shaped leveling spring mounting bar 75 includes a longitudinal section 76 mounted on a respective carriage frame member 56 and an extension section 77 projecting outwardly therefrom. The leveling spring mounting bar 75 is adjustably mounted on the carriage frame member 56. As shown in FIGS. 2 and 3, the leveling spring mounting bar 75 is in a rearward position for supporting a relatively heavy rear press wheel 62. For a lighter rear press wheel, the leveling spring mounting bar 75 would be repositioned forwardly on the carriage assembly 55.

The planter unit 2 described thus far is a Model No. 33 vegetable planter manufactured by Deere & Company of Moline, Ill.

III. LEVELING LINKAGE

The leveling linkage 1 includes a crank 81 having an inverted T-shaped configuration with a base 82 having front and back ends 84, 85 and a leg 83 extending generally upwardly therefrom. The leg 83 includes an upper end 86 and a lower end 87 integrally attached to the base 82. A crank mounting plate 89 extends rearwardly from a respective vertical draft frame bar 39 and is pivotally connected to the crank base front end 84 at point P2 by a bolt 90.

A leveling linkage standard 93 comprising a length of angle iron is mounted on and projects upwardly and rearwardly from a respective back bracket member upper end 28 and includes a receiver 94. A crank rod assembly 96 includes a crank rod 97 slidably and pivotally received in the standard receiver 94 at point P4. The crank rod 97 includes a threaded front end 98 mounting a stop adjustment nut 99 and a lock nut 103.

A tubular stop adjustment spacer 100 slidably receives the crank rod 97 and abuts the standard 93 and the stop adjustment nut 99. The spacer 100 spaces the crank rod threaded front end 98 from the standard receiver 94 so that the threads of the crank rod front end 98 are not damaged by engagement with the standard 93 in its receiver 94. The standard 93 slants rearwardly so that the crank rod 97, which slopes, downwardly from front-to-back, normally forms an angle A4' of approximately ninety degrees with respect to the standard 93. Thus, the crank rod 97 is relatively free to "float" or slidably reciprocate in the standard receiver 94. The crank rod 97 includes a back clevis end 101 pivotally connected to the crank leg upper end 86 by a bolt 102 at point P3.

A leveling spring 105 has an upper end 106 connected to the crank back end 85 at point P6. The leveling spring 105 also has a lower end 107 connected to the leveling spring mounting bar extension section 77 at point P7.

IV. OPERATION

FIGS. 2 and 3 show the implement 6 in its transport and work positions respectively. In a transport position (FIG. 2), the toolbar 7 is raised a substantial distance above a ground surface 110 and is supported by the three-point hitch assembly 15. The pressure springs 49 are somewhat compressed but are at their maximum lengths for the illustrated configuration of the leveling linkage 1 and the planter unit 2. The pressure rod plate 44 is engaged by a pair of stop adjustment nuts 51.

The carriage assembly 55 is suspended at pivot points P5 by the draft frames 37 and at point P7 by the extended leveling spring 105. The leveling spring 105 supports the rear of the carriage assembly 55 in spaced relation well above the ground surface 110 with the planter 6 in its transport position whereby the rear press wheel 62 is normally prevented from engaging the ground surface 110 in transit. At rest in its transport position, the carriage assembly 55 is substantially level as shown in FIG. 2, but in motion it normally rocks or teeters smoothly about the pivotal axis through points P5.

The tension on the leveling spring 105 is transmitted to the crank rod 97 through the crank 81 via its pivotal connection at P2 to the draft frame 37.

A trapezium T is defined in elevation on the planter unit 2 by points P1, P2, P3 and P4; respective apex angles A1, A2, A3 and A4; and respective sides S1 (P1-P2), S2 (P2-P3), S3 (P3-P4) and S4 (P4-P1). The distance from pivotal point P2 to the leveling spring upper end 106 at point P5 is designated L1, and the length of the leveling spring 105 (i.e. the distance between points P6 and P7) is designated L2. The distance from pivotal point P5 to the leveling spring lower end 107 at point P7 is designated L3, and is adjustable by repositioning the leveling spring mounting bar 75. First, second, third, fourth, fifth, sixth and seventh pivotal connections are formed at P1, P2, P3, P4, P5, P6 and P7 respectively. The first, second, third and fifth pivotal connections have respective pivotal axes extending transversely through respective points P1, P2, P3 and P5. The crank rod 97 is adapted to pivot and slide longitudinally with respect to the standard 93 at point P4.

The implement 6 is placed in its work position (FIG. 3) by lowering the toolbar 7 until the gauge wheel assemblies 12 fully engage the ground surface 110. In its work position (FIG. 3) the planter unit 2 is supported by its wheels 61, 62 on the ground surface 110. To bring the weight of the planter unit 2 to bear against the ground surface 110, the transport position height spacing H (FIG. 2) between the toolbar 7 and point P5 is shortened to H' (FIG. 3).

The geometry of the leveling linkage 1 and the planter unit 2 is effected in the transition from transport position (FIG. 2) to work position (FIG. 3) as follows:
(a) the draft frames 37 pivot in a clockwise direction at P1 whereby their horizontal bars 38 are more nearly horizontal;
(b) the pressure springs 49 are compressed by the pressure rod plate 44;
(c) angles A1 and A3 are narrowed to angles A1' and A3' respectively;
(d) angles A2 and A4 are widened to angles A2' and A4' respectively;
(e) the crank 81 rotates counterclockwise about P2 and P3;
(f) the length L2 of leveling spring 105 shortens to L2' whereby the leveling spring 105 retracts; and
(g) trapezium T is modified to trapezium T'.

Proper operation of the planter unit 2 is somewhat dependent on properly loading the press wheel 62. If the leveling spring 105 remains in tension, the press wheel 62 will be somewhat unloaded and may not properly press the ground over the newly deposited seeds. Thus, proper adjustment of the leveling linkage 1 is important to effective operation of the planter units 2, high germination percentages, and crop yields.

The leveling linkage 1 is primarily adjusted for the transport position (FIG. 2) by altering the position of the crank rod stop nut 99, which correspondingly alters the length of S3. Shortening the length of S3 raises the crank base back end 85 at P6 and the rear press wheel 62. With the leveling linkage 1 properly adjusted, the carriage assembly 55 is substantially level at rest in the transport position (FIG. 2), and in the work position (FIG. 3) the leveling spring 105 is fully retracted and thus exerts no uplifting force on a respective press wheel 62.

The crank rod 97 is permitted to "float" or slidably reciprocate within the standard receiver 94, varying the length of S3. Therefore, the planter unit 2 can rock fore and aft about its pivotal axis at P5, for example in response to uneven terrain, and the leveling linkage 1 will accomodate such fore-and-aft rocking by rotating the crank 81 with the leveling spring 105 whereby the crank rod 97 reciprocates. Undue stress on the leveling spring 105 and other components is thus avoided.

The leveling linkage 1 is also adapted to accomodate different press wheels 62, which are available for the planter units 2 to accomodate different operating conditions. For example, with the planter unit 2 in its transport position (FIG. 2), a relatively light press wheel 62 will extend the leveling spring 105 less than a heavier press wheel 62. Thus, with a relatively light press wheel 62, the planter unit 2 would slope upwardly from front-to-back in its transport position. Alternatively, the carriage assembly 55 could be releveled in its transport position (FIG. 2) by either (a) repositioning the stop and lock nuts 99, 103 on the crank rod front end 98 to extend the length of S3 and release some of the transport tension in the leveling spring 105; or (b) repositioning the leveling spring mounting bar 75 to reduce the moment arm L3 whereby the clockwise torque induced by the leveling spring 105 about P5 is correspondingly reduced. However, in the work position (FIG. 3) the weight of the press wheel 62 has no effect on the function of the leveling linkage 1 to release tension in the leveling spring 105.

The transport tension in the leveling spring 105 would be altered by: (a) repositioning the leveling spring mounting bar 75 and thus changing the moment arm L3; or (b) changing the weight of the planter unit 2 rearward of P5, e.g. by dispensing or replenishing the seed content of the hopper 70 or substituting a heavier or lighter rear press wheel 62.

Adjusting the length of S3 with the nuts 99, 103 would alter the transport fore-and-aft pitch of the carriage assembly 55, but would not appreciably affect the transport tension in the leveling spring 105.

The longitudinal position of the leveling spring mounting bar 75 with respect to the carriage assembly 55 determines L3, which is preferably adjusted so that the coils of the leveling spring 105 open in the transport position (FIG. 2). With a lighter rear press wheel 62 or less seed in the hopper 70, it may be desirable to reposition the leveling spring mounting bar 75 forwardly so that the coils of the leveling spring 105 open in the transport position.

It is to be understood that while certain forms of the present invention have been illustrated and described herein, it is not to be limited to the specific forms or arrangement of parts described and shown.

What is claimed and desired to be secured by Letters Patent is as follows:

1. In combination with a ground working implement including a mounting bracket member with upper and lower ends, a draft frame with a front end pivotally connected to said mounting bracket member lower end at a first pivotal connection and a back end, a carriage assembly pivotally connected to said draft frame back end and said implement being movable between a transport position with said carriage assembly suspended at least partly by said draft frame and a work position with said carriage assembly supported on a ground surface, the improvement of a leveling linkage, which comprises:
   (a) a crank including a front end, a back end and an upper end generally defining a triangle;
   (b) said crank front end being pivotally connected to said draft frame back end at a second pivotal connection;
   (c) a tension member having front and back ends, said back end being connected to said crank upper end;
   (d) mounting means adapted for mounting said tension member front end on said mounting bracket upper end;
   (e) a leveling spring having an upper end connected to said crank back end in spaced relation from said connection between said tension member and said crank upper end and a lower end connected to said carriage; and
   (f) said leveling spring being extended with said implement in its transport position and said crank rotating downwardly about said second pivotal connection as said implement is lowered to its work position whereby said leveling spring is retracted, said crank rotation being adapted to leverage the extension and retraction of said leveling spring.

2. The linkage according to claim 1 wherein:
   (a) said tension member comprises a rigid crank rod.

3. The linkage according to claim 2 wherein:
   (a) said crank rod mounting means comprises a standard mounted on and projecting upwardly from said mounting bracket member upper end.

4. The linkage according to claim 2 wherein:
   (a) said crank rod back end comprises a clevis pivotally connected to said crank upper end.

5. The linkage according to claim 4, which includes:
   (a) adjustable mounting means for mounting said leveling spring lower end on said carriage.

6. The linkage according to claim 1 wherein:
   (a) said crank includes a base with said front and back ends and a leg projecting upwardly therefrom, said leg terminating in said crank upper end.

7. In combination with a ground working implement including a mounting bracket member with upper and lower ends, a draft frame with a front end pivotally connected to said mounting bracket member lower end at a first pivotal connection and a back end, a carriage assembly pivotally connected to said draft frame back end and said implement being movable between a transport position with said carriage assembly suspended at least partly by said draft frame and a work position with said carriage assembly supported on a ground surface, the improvement of a leveling linkage, which comprises:
   (a) a crank including a front end, a back end and an upper end;
   (b) said crank front end being pivotally connected to said draft frame back end at a second pivotal connection;
   (c) a tension member having front and back ends, said back end being connected to said crank upper end;
   (d) mounting means adapted for mounting said tension member front end on said mounting bracket upper end;
   (e) a leveling spring having an upper end connected to said crank back end and a lower end connected to said carriage;
   (f) said leveling spring being extended with said implement in its transport position and said crank rotating downwardly about said second pivotal connection as said implement is lowered to its work position whereby said leveling spring is retracted;
   (g) said tension member comprising a rigid crank rod;
   (h) said tension member mounting means comprising a standard mounted on and projecting upwardly from said mounting bracket member upper end; and
   (i) said standard including a crank rod receiver pivotally and slidably receiving said crank rod adjacent to its front end.

8. The linkage according to claim 7, which includes:
   (a) said crank rod front end being threaded; and
   (b) a stop nut and a lock nut threadably received on said crank rod front end in front of said standard.

9. The linkage according to claim 8, which includes:
   (a) a tubular spacer slidably received on said crank rod between said stop nut and said standard.

10. In combination with a ground working implement including a mounting bracket member with upper and lower ends, a draft frame with a front end pivotally connected to said mounting bracket member lower end at a first pivotal connection and a back end, a carriage assembly pivotally connected to said draft frame back end and said implement being movable between a transport position with said carriage assembly suspended at least partly by said draft frame and a work position with said carriage assembly supported on a ground surface, the improvement of a leveling linkage, which comprises:
(a) a crank including a front end, a back end and an upper end;
(b) said crank foot end being pivotally connected to said draft frame back end at a second pivotal connection;
(c) a tension member having front and back ends, said back end being connected to said crank upper end;
(d) mounting means adapted for mounting said tension member front end on said mounting bracket upper end;
(e) a leveling spring having an upper end connected to said crank back end and a lower end connected to said carriage;
(f) said leveling spring being extended with said implement in its transport position and said crank rotating downwardly about said second pivotal connection as said implement is lowered to its work position whereby said leveling spring is retracted;
(g) said crank including a base with said front and back ends and a leg projecting upwardly therefrom, said leg terminating at said crank upper end; and
(h) said upwardly projecting leg being substantially equidistant from said base ends and said crank having an inverted T-shaped configuration.

11. In combination with a planter implement including a mounting bracket member with upper and lower ends, a horizontal draft frame bar with a front end pivotally connected to the mounting bracket member lower end at a first pivotal connection and a back end, a vertical draft frame bar fixedly attached to the horizontal draft frame bar and having upper and lower ends, a carriage assembly pivotally connected to the vertical draft frame bar lower end and having front and back ends mounting drive and press wheels respectively and a seed dispensing system mounted on the carriage, the implement being movable between a transport position with the carriage suspended at least partly by the vertical draft frame bar and a work position with the wheels engaging a ground surface, the improvement of a leveling linkage, which comprises:
(a) a crank including:
  (1) a base with a front end pivotally connected to the draft frame vertical bar at a second pivotal connection and a back end; and
  (2) a leg including a lower end fixedly attached to said base and an upper end, said leg projecting upwardly from said base;
(b) a crank rod assembly including:
  (1) a crank rod mounting standard mounted on said mounting bracket upper end and projecting upwardly therefrom, said standard including a crank rod receiver; and
  (2) a crank rod including a front end and a clevis back end pivotally connected to said crank leg upper end at a third pivotal connection, said crank rod being slidably and pivotally received in said standard receiver at a fourth pivotal connection between said crank rod ends;

(c) a leveling spring including an upper end connected to said crank base back end and a lower end connected to said carriage in spaced relation from said draft frame vertical bar;
(d) said leveling spring being extended with said planter implement in its transport position and retracted with said planter implement in its work position; and
(e) said crank rotating rearwardly about said second pivotal connection as said planter implement moves from its transport position to its work position.

12. The linkage according to claim 11 wherein:
(a) said first, second, third and fourth pivotal connections define a trapezium with respective first, second, third and fourth adjacent angles.

13. The linkage according to claim 12 wherein:
(a) said trapezium having a first configuration with said implement in its transport position and a second configuration with said implement in its work position;
(b) said trapezium first and third adjacent angles being narrower with said implement in its work position than with said implement in its transport position; and
(c) said trapezium second and fourth adjacent angles being narrower with said implement in its transport position than with said implement in its work position.

14. The linkage according to claim 11 wherein:
(a) said toolbar is spaced a predetermined height above said pivotal connection between said vertical draft frame bar lower end and said carriage assembly with said implement in its transport position; and
(b) said toolbar being spaced a lesser height above said pivotal connection between said vertical draft frame bar lower end and said carriage assembly with said implement in its work position.

15. The linkage according to claim 11 wherein:
(a) said leveling spring has a predetermined, extended length with said implement in its transport position; and
(b) said leveling spring has a shorter, retacted length with said implement in its work position.

16. The linkage according to claim 11 wherein:
(a) said draft frame vertical bar lower end is pivotally connected to said carriage assembly at a fifth pivotal connection.

17. The linkage according to claim 11 wherein:
(a) said crank rod forms an angle of approximately ninety degrees with respect to said crank rod mounting standard.

18. The linkage according to claim 11 wherein:
(a) said crank rod front end is male-threaded; and
(b) said crank rod assembly includes a stop nut and a lock nut threadably received on said crank rod front end.

19. The linkage according to claim 18 wherein:
(a) said crank rod includes a tubular spacer slidably received on said crank rod between said crank rod mounting standard and said stop nut, said spacer being adapted to space said male-threaded crank rod front end from said crank rod mounting standard.

* * * * *